July 7, 1959
R. H. BAIR
2,893,720
TRUCK DOCK BUMPER
Filed Nov. 23, 1956
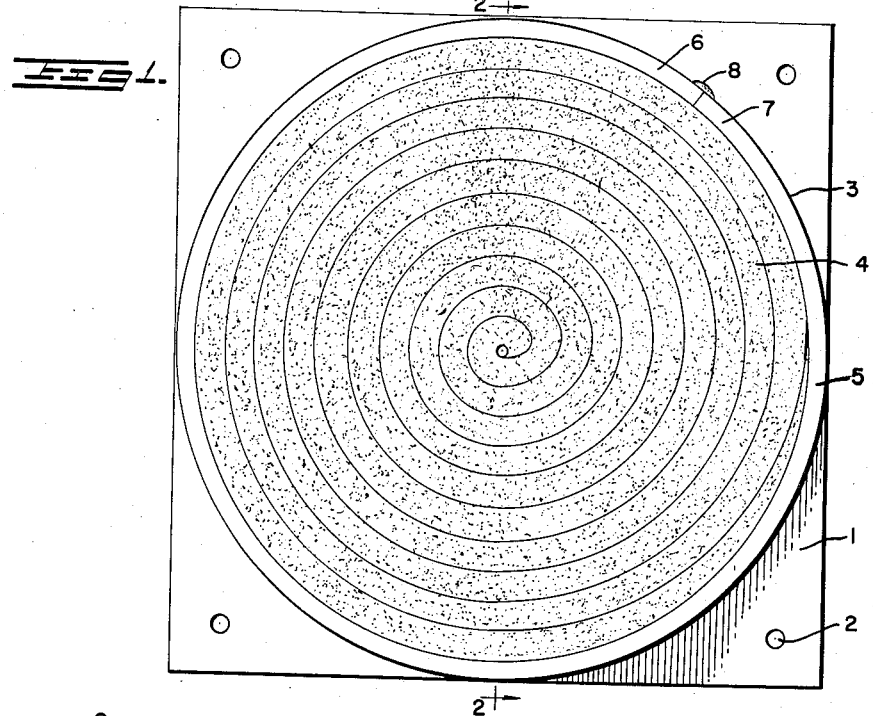
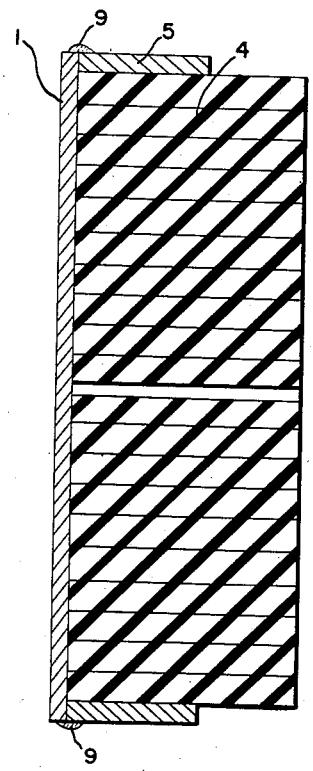
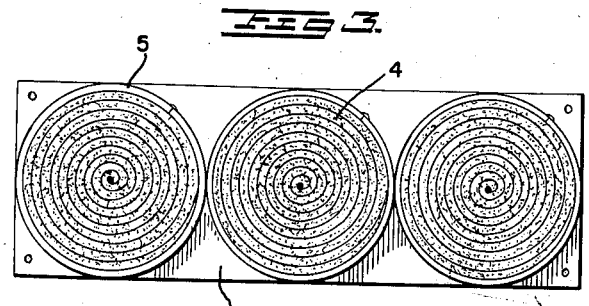
INVENTOR
RICHARD H. BAIR
BY *Harmon & Pierce*
ATTORNEY

United States Patent Office 2,893,720
Patented July 7, 1959

2,893,720

TRUCK DOCK BUMPER

Richard H. Bair, Camp Hill, Pa., assignor to Weiss Bros., Harrisburg, Pa.

Application November 23, 1956, Serial No. 624,104

5 Claims. (Cl. 267—1)

This invention relates to resilient bumpers for truck loading docks and other structures which are subjected to heavy damaging impacts from trucks and other vehicles.

The primary object of this invention is to provide an improved shock absorbing dock bumper of simple, rugged, and inexpensive construction which is readily adaptable to mounting on a loading dock wall, either singly or in clusters to cover zones of the wall which are periodically subjected to impacts from vehicles.

A more specific object of this invention is to provide a shock absorbing dock bumper employing a wound strip of material from a used vehicle-tire encased in a metal jacket to provide a rugged and inexpensive unit.

A further object of this invention is to provide a dock bumper construction wherein plural units may be mounted immediately adjacent to one another on a dock wall, thereby avoiding intervening spaces into which sharp vehicle corners may protrude.

With the foregoing, and other objects in view, the invention resides in the following specification and appended claims certain embodiments and details of construction of which are illustrated in the accompanying drawings, in which:

Figure 1 is a view in elevation of the preferred form of dock bumper comprising the invention;

Figure 2 is a sectional view of the invention taken along the lines 2—2 of Figure 1; and Figure 3 is a view of a plurality of dock bumper units embodying the invention mounted closely adjacent each other on a single mounting plate.

Referring more particularly to the drawings, the dock bumper unit of the invention, as illustrated, includes a mounting plate 1 provided with a plurality of bolt holes 2. To the face of the plate is secured the shock assembly 3. Assembly 3 includes a tightly wound strip of resilient material 4, preferably cut from the tread section of a used vehicle-tire for economy purposes, and a metallic band 5. The band 5 encircles the strip 4 and is tightly bound about the strip during assembly to hold the strip under considerable compression. The ends 6 and 7 of band 5 are welded together at 8. The band 5 is welded at suitable points 9 to plate 1. The width of the band is somewhat less than the width of the strip material 4, being illustrated as slightly greater than half such width. Thus, the portion of strip 4, protruding beyond the band, is susceptible to a radial as well as compressive movement under impact to absorb shocks. One edge of the band 5 is flush with one edge of the material 4 to aid in the ease of securement of the band to mounting plate 1.

While the plate 1 is preferred, it is obvious that suitable mounting brackets might be connected to band 5 or be formed integrally therewith to provide means for mounting the assembly 3 on a dock wall.

In Figure 3 a plurality of bumper assemblies 3 are secured by welding to an elongated backing plate 10. With this construction it will be noted that the bands 5 of adjacent assemblies 3 are in contact with each other and hence very little space is provided between adjacent shock absorbing strips 4, eliminating the hazards of truck corners hitting the dock wall between assemblies. It is obvious that other assemblies could be mounted above and below those illustrated in Figure 4 to more completely protect a dock wall from damage by trucks of different heights.

While it is preferred to utilize used tire tread portions to form the spiral wound strip 4, it is not essential. Any resilient material in sheet form with durable characteristics would suffice, but preferably the material should be rather stiff in character.

By forming the material 4 into a tightly wound spiral and holding the same under compression with the band 5, a relatively stiff resilient unit is produced which will give substantial protection to a dock wall.

The construction of the dock bumper also represents a considerable improvement over the prior art as may be best illustrated by Patent No. 2,649,295— issued to Schuyler in 1953. This improvement may be best realized when considering that the bumper of the instant invention comprises only three parts joined together.

It is realized that various modifications in structural detail may become apparent to one skilled in the art, and it is intended that the appended claims will cover any such modifications within the general scope of the invention.

I claim:

1. A bumper for truck loading docks or the like comprising a strip of resilient sheet material wound into a spiral form, a retaining band secured about said spirally wound material and holding said material under compression to form an assembly, the said band having a width less than the width of the material, and means connected with said retaining band to facilitate securing of the assembly to a loading dock.

2. A bumper for truck loading docks or the like comprising a strip of resilient sheet material wound into a spiral form, a retaining band secured about said spirally wound material and holding said material under compression to form an assembly, the said band having a width less than the width of the material, and a mounting plate for facilitating the securement of the assembly to a loading dock, the mounting plate being connected to the band.

3. A bumper for truck loading docks or the like comprising a plurality of adjacent resilient assemblies, each assembly including a spirally wound strip of resilient sheet material encircled by a retaining band holding the material under compression, each said band having a width less than the width of the material, and means interconnected with the bands of all of said assemblies to facilitate the securing of the bumper to a loading dock.

4. A bumper for truck loading docks or the like comprising a plurality of adjacent resilient assemblies, each assembly including a spirally wound strip of resilient sheet material encircled by a retaining band holding the material under compression, and a single mounting plate interconnected with the bands of all of said assemblies to facilitate the securing of the bumper to a loading dock.

5. A bumper for truck loading docks or the like comprising a strip of resilient sheet material wound into a spiral form to form a roll, a retaining band secured about said wound material and holding said material under compression to form an assembly, the said band having a width less than the width of the material with one edge of the band being substantially flush with an end face of the roll of material thereby constituting an unbound portion at the other end face of the roll to receive impact shocks, and means connected with the retaining band to facilitate securing of the assembly to a loading dock.

References Cited in the file of this patent

UNITED STATES PATENTS

| | | |
|---|---|---|
| Re. 24,276 | Schuyler | Feb. 12, 1957 |
| 134,471 | Frazee | Dec. 21, 1872 |
| 1,694,756 | Short | Dec. 11, 1928 |
| 2,165,702 | Haushalter | July 11, 1939 |
| 2,184,519 | Eppensteiner | Dec. 26, 1939 |
| 2,753,829 | Agra | July 10, 1956 |

FOREIGN PATENTS

| | | |
|---|---|---|
| 365,773 | Great Britain | Jan. 28, 1932 |